(12) United States Patent
Verma et al.

(10) Patent No.: US 11,636,366 B2
(45) Date of Patent: Apr. 25, 2023

(54) USER SERVICE PREDICTION IN A COMMUNICATION NETWORK

(71) Applicant: TELEFONAKTIEBOLAGET LM ERICSSON (PUBL), Stockholm (SE)

(72) Inventors: Vikas Verma, Tamil Nadu (IN); Vincent Huang, Sollentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 857 days.

(21) Appl. No.: 15/100,950

(22) PCT Filed: Dec. 4, 2013

(86) PCT No.: PCT/SE2013/051446
§ 371 (c)(1),
(2) Date: Jun. 1, 2016

(87) PCT Pub. No.: WO2015/084224
PCT Pub. Date: Jun. 11, 2015

(65) Prior Publication Data
US 2016/0300153 A1    Oct. 13, 2016

(51) Int. Cl.
*G06N 20/00*    (2019.01)
*G06N 7/00*     (2023.01)
(Continued)

(52) U.S. Cl.
CPC .............. *G06N 7/005* (2013.01); *G06N 20/00* (2019.01); *H04L 67/306* (2013.01);
(Continued)

(58) Field of Classification Search
CPC ...... H04L 41/147; H04L 41/16; H04W 24/08; H04W 4/50; G06N 5/00–047; G06N 7/00–005; G06N 20/00
(Continued)

(56) References Cited

U.S. PATENT DOCUMENTS 5,434,985 A    7/1995   Emma et al.
8,266,074 B1   9/2012   Vermeulen et al.
(Continued)

FOREIGN PATENT DOCUMENTS

EP    1465389 A2      10/2004
WO    2011094940 A1   8/2011

OTHER PUBLICATIONS

Do et al., "By their apps you shall understand them: mining large-scale patterns of mobile phone usage," MUM '10, Dec. 1-3, 2010, Limassol, Cyprus (Year: 2010).*
(Continued)

*Primary Examiner* — Jue Louie
(74) *Attorney, Agent, or Firm* — Rothwell, Figg, Ernst & Manbeck, P.C.

(57) ABSTRACT

A method in a communication network for predicting whether a second service will be used by a user in a future time slot. The method comprises obtaining information about which services, of a plurality of services, have historically been used in which time slots in the communication network. The method comprises analysing the obtained information to determine that, whether a first service of the plurality of services is used in any of the historic time slots, correlates with whether the second service of the plurality of services is used in said historic time slot. The method comprises predicting whether the first service will be used by the user in the future time slot. The method comprises predicting, based on whether the first service has been predicted to be used in the future time slot, whether the second service will be used by the user in said future time slot.

17 Claims, 3 Drawing Sheets

(51) Int. Cl.
  *H04W 4/70* (2018.01)
  *H04W 4/50* (2018.01)
  *H04L 67/306* (2022.01)
  *H04L 67/50* (2022.01)

(52) U.S. Cl.
  CPC ............ *H04L 67/535* (2022.05); *H04W 4/50* (2018.02); *H04W 4/70* (2018.02)

(58) Field of Classification Search
  USPC .............................................. 706/12, 45–48
  See application file for complete search history.

(56) References Cited

U.S. PATENT DOCUMENTS

| | | | | |
|---|---|---|---|---|
| 2011/0199934 A1* | 8/2011 | Olofsson et al. | ..... | H04W 24/10 370/252 |
| 2011/0264663 A1* | 10/2011 | Verkasalo | ............... | G06F 17/30 707/740 |
| 2013/0080641 A1* | 3/2013 | Lui et al. | ................ | H04L 29/08 709/226 |
| 2014/0115146 A1* | 4/2014 | Johnson et al. | ........ | H04L 12/26 709/224 |
| 2014/0222997 A1* | 8/2014 | Mermoud et al. | .... | H04L 41/142 709/224 |
| 2014/0226542 A1* | 8/2014 | Gupta et al. | ...... | H04W 52/0251 370/280 |

OTHER PUBLICATIONS

Leroux et al., "Mobile application usage prediction through context-based learning," Journal of Ambient Intelligence and Smart Environments 5 (2013) pp. 213-235 (Year: 2013).*

Samra et al., "Analysis of Clustering Technique in Android Malware Detection," 2013 Seventh International Conference on Innovative Mobile and Internet Services in Ubiquitous Computing, pp. 729-733 (2013) (Year: 2013).*

Bohmer et al., "Falling Asleep with Angry Birds, Facebook and Kindle—A Large Scale Study on Mobile Application Usage," In MobileHCI 2011, Aug. 30-Sep. 2, 2011, Stockholm, Sweden, pp. 47-56 (Year: 2011).*

Abhinav Parate et al., "Practical Prediction and Prefetch for Faster Access to Applications on Mobile Phones," UbiComp '13, Sep. 8-12, 2013, Zurich, Switzerland (Year: 2013).*

International Search Report dated Sep. 1, 2014, in International Application No. PCT/SE2013/051446, 4 pages.

* cited by examiner

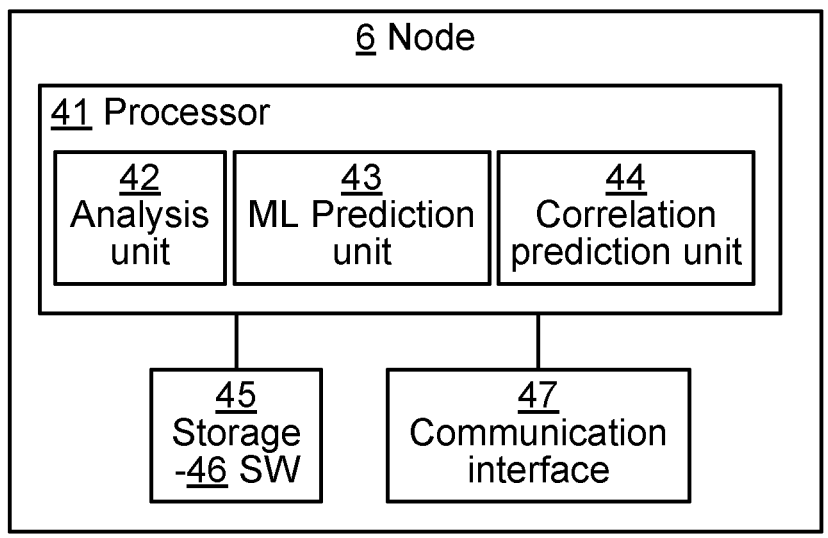
Fig. 4
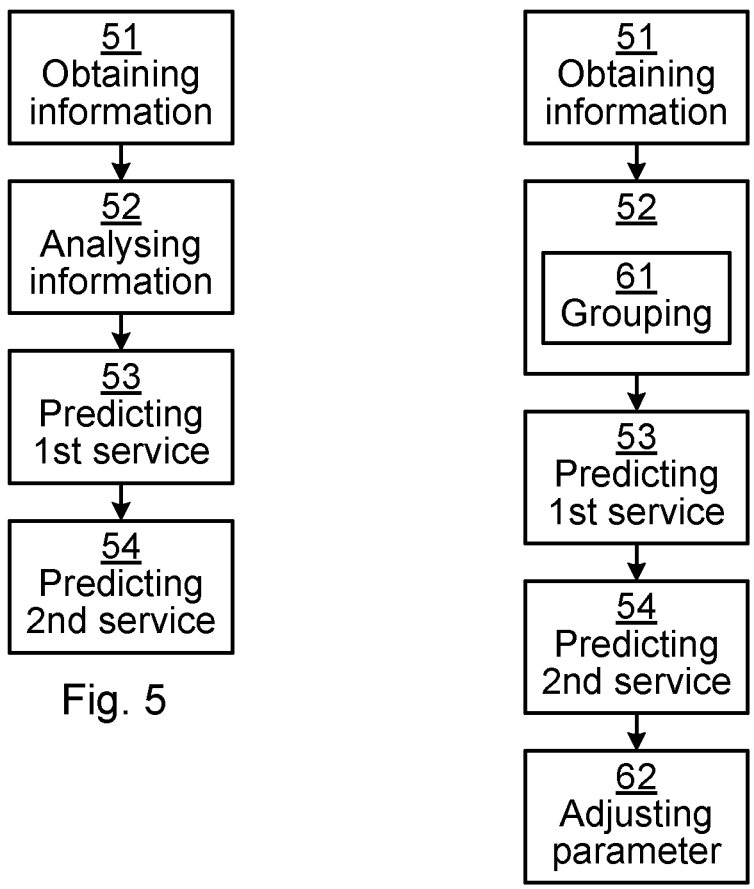
Fig. 5
Fig. 6

USER SERVICE PREDICTION IN A COMMUNICATION NETWORK

CROSS REFERENCE TO RELATED APPLICATION(S)

This application is a 35 U.S.C. § 371 National Phase Entry Application from PCT/SE2013/051446, filed Dec. 4, 2013, designating the United States, the disclosure of which is incorporated herein in its entirety by reference.

TECHNICAL FIELD

The present disclosure relates to a method and a device in a communication network for predicting whether a service will be used by a user in a future time slot.

BACKGROUND

Given a set of users and their past service-usage data, it may be desirable to predict whether a user will be using a particular service in the next time slot or not. For example, to predict whether certain service will be used by a user in next 10 minutes. Predicting whether a service will be used by the user in the next time slot can be realized by learning a model using the data from past service-usage of users. The user may use several different services in any certain time slot. Usage of each service can be represented by using a binary vector of 0 and 1 where 1 and 0 indicate whether a particular service is being used or not used in a particular time slot. There are many existing algorithms that can be used to predict the next service in the time slot sequence given a past service sequence. Hidden Markov Model (HMM) is one such state of the art algorithm. In order to predict the usage of any particular service in the next time slot, it is possible to train such machine learning models using the binary representation of the usage of that particular service.

Using the above mentioned existing model, it is possible to learn a separate model for each service.

U.S. Pat. No. 8,266,074 discloses a method and system for dynamic pricing of web services utilization. The method may include dynamically predicting utilization of a web service's computing resource that is expected to occur during a given interval of time, and dependent upon the dynamically predicted utilization, setting a price associated with utilization of the web services computing resource occurring during the given interval of time. The method may further include providing the price to a customer.

SUMMARY

As mentioned above, the prior art allows machine learning of algorithms for prediction of each service individually. However, it is herein proposed that for a more accurate prediction of usage of a particular service, it may be suitable to utilize the usage history also of other services along with the usage history of the predicted service. A way to utilize the usage history of other services is to represent each possible service combination by a new symbol and learn a machine learning model using this new representation of service combinations. This new representation can be called a joint representation of services. However, the combination of services increases exponentially with the number of services and cannot be easily handled in solving a machine learning problem. In order to handle prediction of a large number of services, it is proposed, in accordance with the present disclosure, utilize observed covariance of services in order to allow prediction of a service usage based on a prediction of the usage of another service.

According to an aspect of the present disclosure, there is provided a method in a communication network for predicting whether a second service will be used by a user in a future time slot. The method comprises obtaining information about which services, of a plurality of services, have historically been used in which time slots in the communication network. The method also comprises analysing the obtained information to determine that, whether a first service of the plurality of services is used in any of the historic time slots, correlates with whether the second service of the plurality of services is used in said historic time slot. The method also comprises predicting whether the first service will be used by the user in the future time slot. The method also comprises predicting, based on whether the first service has been predicted to be used in the future time slot, whether the second service will be used by the user in said future time slot.

According to another aspect of the present disclosure, there is provided a computer program product comprising computer-executable components for causing a network node to perform an embodiment of the method of the present disclosure when the computer-executable components are run on processor circuitry comprised in the network node.

According to another aspect of the present disclosure, there is provided a network node for a communication network. The network node comprises processor circuitry, and a storage unit storing instructions that, when executed by the processor circuitry, cause the network node to obtain information about which services, of a plurality of services, have historically been used in which time slots in the communication network. The instructions also cause the network node to analyse the obtained information to determine that, whether a first service of the plurality of services is used in any of the historic time slots, correlates with whether the second service of the plurality of services is used in said historic time slot. The instructions also cause the network node to predict whether the first service will be used by the user in the future time slot. The instructions also cause the network node to predict, based on whether the first service has been predicted to be used in the future time slot, whether the second service will be used by the user in said future time slot.

According to another aspect of the present disclosure, there is provided a computer program for predicting whether a second service will be used by a user in a future time slot. The computer program comprises computer program code which is able to, when run on processor circuitry of a network node, cause the network node to obtain information about which services, of a plurality of services, have historically been used in which time slots in the communication network. The code is also able to cause the network node to analyse the obtained information to determine that, whether a first service of the plurality of services is used in any of the historic time slots, correlates with whether the second service of the plurality of services is used in said historic time slot. The code is also able to cause the network node to predict whether the first service will be used by the user in the future time slot. The code is also able to cause the network node to predict, based on whether the first service has been predicted to be used in the future time slot, whether the second service will be used by the user in said future time slot.

According to another aspect of the present disclosure, there is provided a computer program product comprising an embodiment of the computer program of the present disclosure and a computer readable means on which the computer program is stored.

The present disclosure is based on an observation that a use of a first service in a communication network may correlate with the use of a second service in said network. The correlation may be such that a use of the first service often correlates with the use of the second service, or a non-use of the first service may often correlate with the non-use of the second service, or the use of the first service may often correlate with the non-use of the second service, or the non-use of the first service may often correlate with the use of the second service. All these four correlation situations may be contemplated when analysing the obtained historic information. The first and second services may be used by the same user, but it is also contemplated that the service usage of different users may correlate with each other. The analysed information may be regarding historic usage of the same user which for which the usage of the second service is predicted, or the observed correlation of different services of one user may be valid and used also for other users. By means of the embodiments of the present disclosure, the first service may be made to represent the usage also of the second service, and possibly further services which have usage correlation with the first service. Thus, it may be enough to predict the future usage of the first service, typically based on historic usage patterns in accordance with prior art, in order to predict the future usage of a whole group of services, thereby reducing the processing overhead for performing the service usage prediction for any user in the communication network.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which:

FIG. 4 is a schematic block diagram of an embodiment of a network node of the present disclosure.

FIG. 5 is a schematic flow chart of an embodiment of a method of the present disclosure.

FIG. 6 is a schematic flow chart of another embodiment of a method of the present disclosure.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

Figure 1:
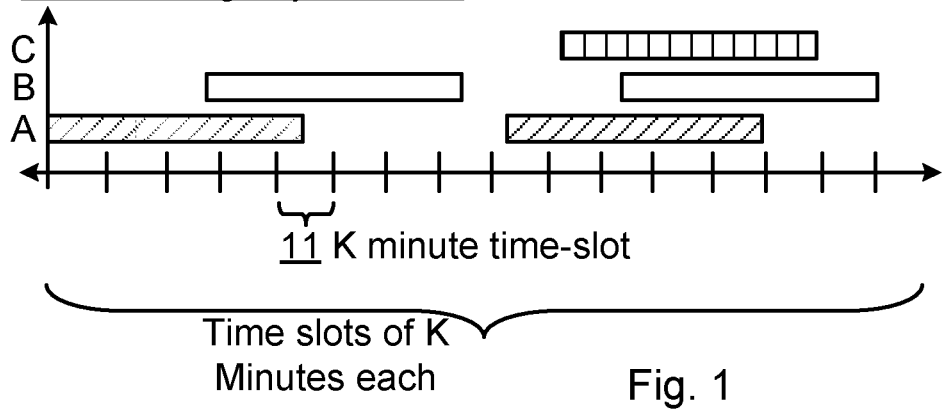
FIG. 1 is a schematic graph illustrating example usages of different time slots by different services in a communication network in accordance with the present disclosure.

Predicting whether a service will be used by a user 2 in a future time slot can be realized by learning a model using the data from past service-usage of users. The service-usage of a user 2 can be as illustrated in FIG. 1. In the situation illustrated in FIG. 1, a user 2 uses three different services denoted A, B & C in different time slots 11, of which only one has been marked with a reference numeral. The time slots 11 may have any duration, e.g. between 1 and 30 minutes, but all time slots 11 typically have the same duration. As can be seen in FIG. 1, some time slots are used by one, two or all three services A-C, while some time slots may not be used by any of the services.

Figure 2:
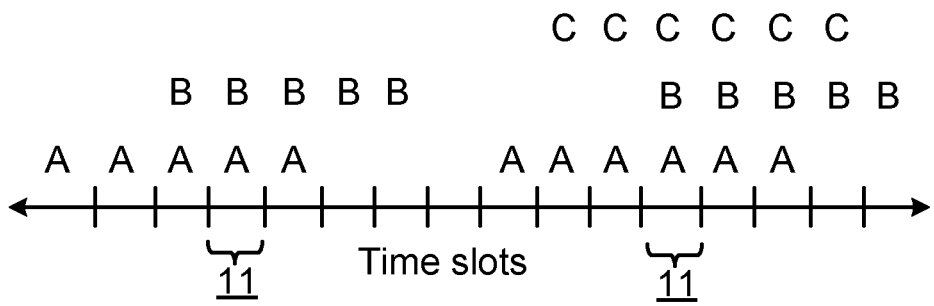
FIG. 2 is an other schematic graph illustrating example usages of different time slots by different services in a communication network in accordance with the present disclosure.

Another way of illustrating the situation of FIG. 1, is depicted in FIG. 2, where a symbol, here the letters A, B or C, is used for each service in the time slots 11 in which it is used. It can be noted that while FIG. 2 shows which services are used in which time slots 11, just as FIG. 1 does, FIG. 2 is a more digital representation since it only states whether a service is used in a time slot or not, not how much of the time slot is used by the service. Thus, even if only a service is used in the beginning or end of a time slot 11, it is regarded as used in the time slot in accordance with FIG. 2.

The presentation of the service usage in FIG. 2 may be further digitalised into a binary representation of the service usage. Usage of each service can be represented by using a binary vector of 0 and 1 where 1 indicates that the service is used in the time slot and 0 indicates that the service is not being used in the time slot. By using this binary representation, the binary representation for services A, B and C, as shown in FIGS. 1 and 2, can be illustrated as shown in table 1.

TABLE 1

| Service | Binary Representation | | | | | | | | | | | | | | | |
|---|---|---|---|---|---|---|---|---|---|---|---|---|---|---|---|---|
| A | 1 | 1 | 1 | 1 | 1 | 0 | 0 | 0 | 1 | 1 | 1 | 1 | 1 | 1 | 0 | 0 |
| B | 0 | 0 | 1 | 1 | 1 | 1 | 1 | 0 | 0 | 0 | 0 | 1 | 1 | 1 | 1 | 1 |
| C | 0 | 0 | 0 | 0 | 0 | 0 | 0 | 0 | 0 | 1 | 1 | 1 | 1 | 1 | 1 | 0 |
| Slot# | 1 | 2 | 3 | 4 | 5 | 6 | 7 | 8 | 9 | 10 | 11 | 12 | 13 | 14 | 15 | 16 |

A way to utilize the usage history of other services is to represent each possible service combination by a new (observation) symbol and learn a machine learning model using this new representation of service combinations. This new representation can be called a joint representation of services. However, the combination of services increases exponentially with the number of services and cannot be easily handled in solving a machine learning problem.

A joint representation of the situation illustrated in table 1, as well as in FIGS. 1 and 2, may be formed as shown in table 2. Each column in Table 1 is a usage vector of the services that are being used in each time-slot. If we have N different services, then there may be $2^N$ possible usage vectors of the N services in any time slot 11. For example, if the three different services A, B and C, as in table 1, are used by the user 2, then there will be eight different possible usage vectors. In order to jointly model the service usage, each usage vector is treated as an observation symbol.

TABLE 2

Usage vectors and corresponding observation symbols.

| Vector | | | | | | | |
|---|---|---|---|---|---|---|---|
| [0, 0, 0] | [1, 0, 0] | [0, 1, 0] | [0, 0, 1] | [1, 1, 0] | [1, 0, 1] | [0, 1, 1] | [1, 1, 1] |
| Symbol $O_1$ | $O_2$ | $O_3$ | $O_4$ | $O_5$ | $O_6$ | $O_7$ | $O_8$ |

Using the above mentioned way of treating the usage vector as an observation symbol, the service-usage data from any user 2 can be represented as a sequence of observation symbols. For example, the service-usage data from the user 2 using the three services A, B and C in accordance with table 1 can be represented as follows:

$O_2, O_2, O_5, O_5, O_5, O_3, O_3, O_1, O_2, O_6, O_6, O_8, O_8, O_8, O_3, O_3$.

It is possible to use an algorithm e.g. a conventional machine learning (ML) model like HMM to compute the observation symbol probability distribution in a future, e.g. the next time slot #17 in accordance with table 1. This observation symbol probability can be used to compute the probability of occurrence of a particular service A, B or C in the future time slot 11.

It can be noted that in many of the conventional machine-learning algorithms that predict the next observation variable using a given observation sequence, the number of parameters to be learned are linear with respect to the number of observation symbols. Hence, these types of models are will result in a very large processing overhead for problems where the number of observed symbols is large.

An example of such a kind of algorithms is HMM. In HMM, it is required to compute the probability of emission of each observation symbol from a hidden state. Each such probability is a parameter of the model. Hence, the number of parameters in HMM is linear to the number of observed symbols.

It is also noted that if the number of different services A-C used by the users is small (e.g. seven), the number of observed symbols created using the method mentioned above may be manageable (for seven different services, the number of observation symbols will be $2^7=128$). However, if the number of different services used by the users increases beyond a level, then the number of observation symbol will be very large. For example, if the number of different services is 20, then the number of observation symbols will be $2^{20}$ resulting in more than one million observation symbols. In practice, the number of observed different applications used by the users of a regular cellular radio communication network has been e.g. 33, resulting in more than 8590 million possible observation symbols.

Thus, the conventional models for predicting the next observation symbol cannot be readily applied to the problem of prediction of a set of services when the number of services is large.

To overcome this problem, in accordance with the present disclosure, a subset of the set of distinct services are selected. This subset is herein called "representative subset", and the services of this subset are called "representative services". The services which are not part of the representative subset are called "non-representative services". After creation of the representative subset, the model described above with reference to tables 1 and 2 can be used for computing the probability of the usage of any representative service. These computed probabilities of the usage of the representative services can then be used for computing the probability of the usage of the non-representative services in accordance with the present disclosure.

Figure 3:
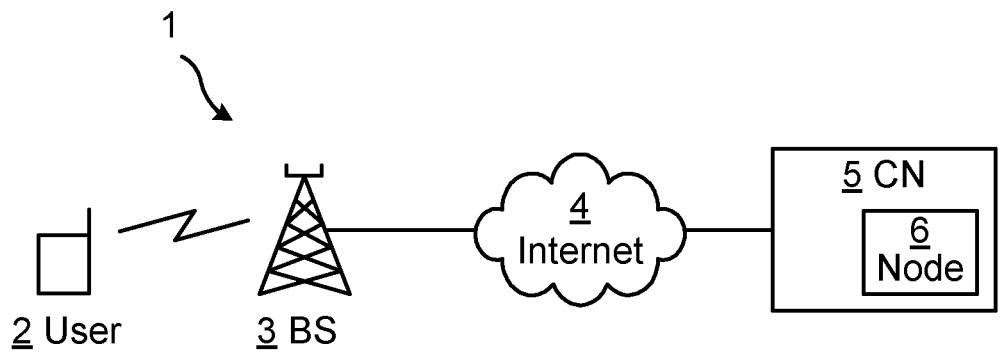
FIG. 3 is a schematic view of an embodiment of a communication network in accordance with the present disclosure.

FIG. 3 is a schematic illustration of an embodiment of a communication network 1 in accordance with the present disclosure. A user 2, e.g. a communication device such as a radio device, is connected to a core network (CN) 5 via a radio access network (RAN) comprising a base station (BS) 3, and optionally via the Internet 4. The user 2 may be any user which is configured to use a communication network e.g. the communication network 1 of FIG. 3, e.g. a radio device. The radio device may be any device or user equipment (UE), mobile or stationary, enabled to communicate over a radio cannel in a communications network, for instance but not limited to e.g. mobile phone, smart phone, modem, sensors, meters, vehicles (e.g. a car or the like), household appliances, medical appliances, media players, cameras, or any type of consumer electronic, for instance but not limited to television, radio, lighting arrangements, tablet computer, laptop, or personal computer (PC). However, the user may alternatively be configured for wired communication with the communication network 1. The communication network 1, may be in accordance with any communication standard, e.g. a cellular radio communication standard such as a Third Generation Partnership (3GPP) standards e.g. a Long Term Evolution (LTE) standard. Correspondingly, the BS 3 may operate in accordance with any radio access technology (RAT) e.g. a 3GPP RAT such as LTE. In a wired network 1, the BS 3 may be replaced by a wired switch or router. The communication network 1 comprises a network node 6, which is in the embodiments illustrated in FIG. 3 positioned in the CN 5, but it may in other embodiments be positioned elsewhere in the network 1, e.g. in the RAN of the BS 3, or in the BS 3 itself. The network node 6 may be any node capable of performing the method of predicting whether a second service B will be used by a user 2 in a future time slot 11, in accordance with the present disclosure.

In some embodiments of the present disclosure, the predicting of whether the first service A will be used is done at least partly by means of a machine learning algorithm. However, in other embodiments it may possible to obtain whether the first service is used from external knowledge and then predict the usage of the second service using that information. In some embodiments, the machine learning algorithm is based on a hidden Markov model (HMM) or a Bayesian network model.

In some embodiments of the present disclosure, at least one parameter of the communication network 1 may be adjusted based on the predictions of whether the first and/or the second service A/B will be used by the user 2 in the future time slot 11. In some embodiments, said at least one parameter comprises a discontinuous reception, DRX, parameter for the user 2. If e.g. a service requiring low latency is predicted in the future time slot 11, then the DRX timers (which are examples of parameters as discussed herein) in that time slot may be adjusted to be shorter than if e.g. a service which does not require short latency is predicted in the time slot. It should be noted that DRX parameters are only some examples of parameters which may be adjusted. Any parameter of the network may be adjusted in view of the predictions made.

In some embodiments of the present disclosure, the obtaining of information may comprise obtaining information about which services A, B and/or C etc. have historically been used in which time slots 11 by the user 2. In some embodiments, the analysing then comprises determining that, whether the first service A is used in any of the historic time slots 11 by the user 2, correlates with whether the second service B is used in said historic time slot 11 by said user 2. In these embodiments, the predicting is made on a per user level, where the historical service usage of a user 2, is analysed for predicting the future service usage of the user 2. However, especially if the number of users 2 in the network 1 is large, it may be convenient to perform the analysing and predicting for a group of users. In this case, selecting a subset of services for each user and then learning e.g. a ML model on top of these selected services will not be feasible in terms of computation resources. Hence it may be preferable to perform embodiments of the method of the present disclosure for a group of users 2.

In some embodiments of the present disclosure, the predicting whether the second service B will be used comprises predicting that the second service will be used in the future time slot 11 if the predicting whether the first service A will be used comprises predicting that the first service will be used in said future time slot 11. In this case there is a positive correlation between the use of service B and the use of the service A. Typically, the non-use of service B in the time slot would correlate with the non-use of the service A in the same time slot, but not necessarily in all embodiments. In other embodiments, there may be a negative correlation between the use and/or non-use of the service B and the use of the service A.

In some embodiments of the present disclosure, the analysing comprises grouping the plurality of services A, B, C etc. into a plurality of groups, each of which groups being represented by a representative service, the first service A being such a representative service, and any other services A, C of each group being represented by the representative service of said group such as to allow predicting, based on whether the representative service B of the group has been predicted to be used in the future time slot 11, whether the represented service(s) A, C in the group will be used by the user 2 in said future time slot. Thus, e.g. all the services used in the network 1, e.g. by the same user 2, may be grouped to form a plurality of groups. Each group may comprise any number of services, depending on how many services correlates sufficiently well with the representative service B of each group. By this, only the representative service B of each group need to be predicted, e.g. by means of an ML algorithm, after which the usage of the represented services may be predicted based on the prediction made for the representative service B of that group.

In some embodiments of the present disclosure, the method of the present disclosure is performed by a node 6 in a core network 5 of the communication network 1. As mentioned above, the node 6 may be located anywhere in or otherwise associated with the network 1, but it may be convenient to locate the node 6 in the CN 5 where information about the service usage in the network 1 may be available.

In some embodiments of the present disclosure, the correlation between the usage of the first service A with the usage of the second service B is at least 70%, such as at least 80% or at least 90%. Of course, the method can better predict the usage of the second service B in the time slot 11, the higher the correlation is, but also less strong correlations may be usable and present an advantage to predicting each service independently or by means of observation symbols for each vector as discussed above.

In some embodiments of the present disclosure, the future and historic time slots 11 have a uniform length of between 1 and 30 minutes. As previously mentioned, the time slots may have any duration/length, but a length within the range of 1-30 minutes may be suitable in many embodiments.

In some embodiments of the present disclosure, the plurality of services A, B & C etc. comprises Voice over IP, streaming video, e-mail, instant messaging, social networking, and/or automatic application updating services used by the user 2. These are some examples of services which may be used by a user in the network 1, but there are also many other services which may typically be used in such a network 1.

In some embodiments of the present disclosure, the user 2 is a mobile phone, e.g. a smartphone; a computer, e.g. a portable computer or a pad; or a machine-to-machine (M2M) device. These are only some examples of users with which embodiments of the present disclosure may be useful.

FIG. 4 schematically illustrates an embodiment of a network node 6 of the present disclosure. The node 6 comprises processor circuitry 41 e.g. a central processing unit (CPU). The processor circuitry 41 may comprise one or a plurality of processing units in the form of microprocessor(s). However, other suitable devices with computing capabilities could be comprised in the processor 41, e.g. an application specific integrated circuit (ASIC), a field programmable gate array (FPGA) or a complex programmable logic device (CPLD). The processor 41 is configured to run one or several computer program(s) or software 46 stored in a storage unit 45 e.g. a memory. One or several modules may be formed in the processing circuitry 41 by the processing circuitry executing software (SW) 46 stored in the storage unit 45, e.g. an analysis unit 42 for the analysing of the obtained information in accordance with embodiments of the present disclosure, a prediction unit, e.g. an ML prediction unit, 43 for the predicting of whether the first service A will be used by the user 2 in the future time slot 11, and/or a correlation prediction unit 44 for the predicting of whether the second service B will be used by the user 2 in said future time slot 11. The storage unit is regarded as a computer readable means as discussed herein and may e.g. be in the form of a Random Access Memory (RAM), a Flash memory or other solid state memory, or a hard disk, or be a combination thereof. The processor circuitry 41 is also configured to store data in the storage unit 45, as needed. The node 6 also comprises a communication interface 47 for communication with other parts/nodes of the communication network 1. The communication interface 47 may comprise a transmitter and a receiver, which may be combined to form a transceiver or be present as distinct units within the communication interface.

FIG. 5 is a schematic flow chart of an embodiment of the method of the present disclosure. The method is for predicting whether a second service B will be used by a user 2 in a future time slot 11. The future time slot may be any future time slot, e.g. the next time slot, wherein each time slot may be e.g. 30 minutes. Information is obtained 51 about which services A, B and/or C etc., of a plurality of services, have historically been used in which time slots 11 in the communication network 1. Then, the obtained 51 information is analysed 52, e.g. by means of the analysis unit 42 of the processing circuitry 41, to determine that, whether a first service A of the plurality of services is used in any of the historic time slots 11, correlates with whether the second service B of the plurality of services is used in said historic time slot 11. The method also comprises predicting 53 whether the first service A will be used by the user 2 in the future time slot 11. This predicting 53 may be done before or concurrently with the obtaining 51 and the analysing 52, but may typically be done after the obtaining 51 and the analysing 52. The predicting 53 may e.g. be done by means of an ML algorithm, as discussed herein. The, after both the analysing 52 and the predicting 53, it is predicted 54 based on whether the first service A has been predicted 53 to be used in the future time slot 11, whether the second service B will be used by the user 2 in said future time slot 11. This is possible to predict since the analysing 52 has determined that there is a correlation between the usage of the second service B and the usage of the first service A.

FIG. 6 is a schematic flow chart of another embodiment of the method of the present disclosure. The method embodiment is for predicting whether a second service B will be used by a user 2 in a future time slot 11, and the steps of obtaining 51, analysing 52, predicting 53 whether the first service A will be used by the user 2, and the predicting 54 whether the second service B will be used by the user 2 in said future time slot 11 are as discussed above in respect of FIG. 5. In some embodiments, the step of analysing 52 comprises grouping 61 the plurality of services A, B and/or C etc. into a plurality of groups, each of which groups being represented by a representative service, the first service A being such a representative service, and any other services A and/or C etc. of each group being represented by the representative service of said group such as to allow predicting, based on whether the representative service of the group has been predicted to be used in the future time slot 11, whether the represented service(s) in the group will be used by the user 2 in said future time slot. In some embodiments, the method may comprise adjusting 62 at least one parameter of the communication network 1 based on the predictions 53 and 54 of whether the first and/or the second service A/B will be used by the user 2 in the future time slot 11.

Figure 7:
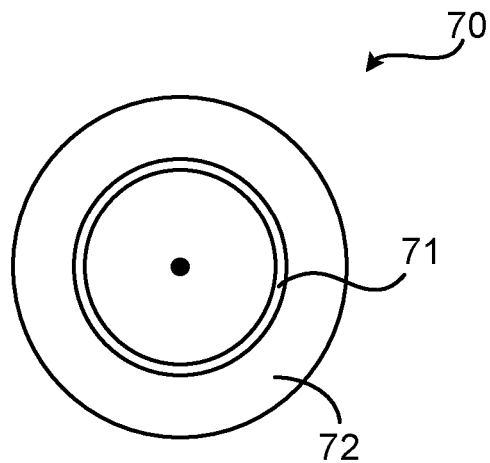
FIG. 7 is a schematic illustration of an embodiment of a computer program product of the present disclosure.

FIG. 7 illustrates a computer program product 70. The computer program product 70 comprises a computer readable medium 72 comprising a computer program 71 in the form of computer-executable components 71. The computer program/computer-executable components 71 may be configured to cause a network node 6, e.g. as discussed herein, for predicting whether the second service B will be used by the user 2 in the future time slot 11, to perform an embodiment of the method of the present disclosure. The computer program/computer-executable components may be run on the processor circuitry 41 of the node 6 for causing the node to perform the method. The computer program product 70 may e.g. be comprised in a storage unit or memory 45 comprised in the node 6 and associated with the processor circuitry 41. Alternatively, the computer program product 70 may be, or be part of, a separate, e.g. mobile, storage means, such as a computer readable disc, e.g. CD or DVD or hard disc/drive, or a solid state storage medium, e.g. a RAM or Flash memory.

Example

Figure 8:
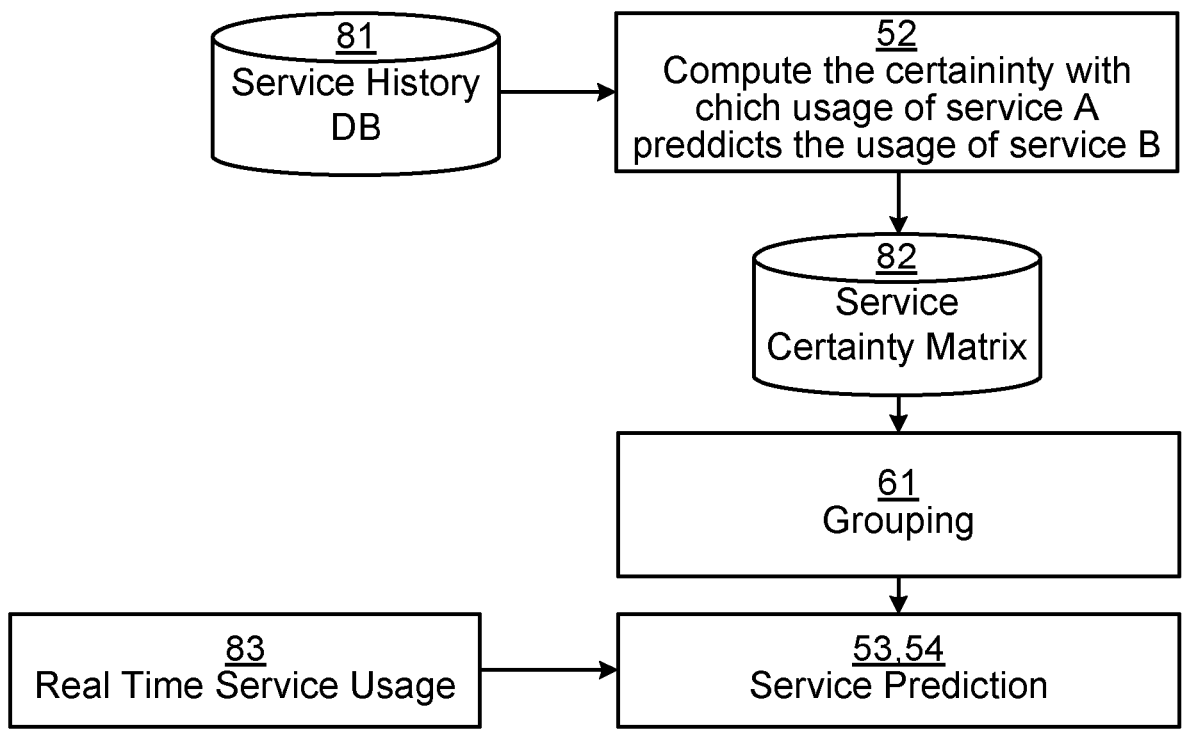
FIG. 8 is a schematic block diagram of an example embodiment of a method of the present disclosure.

In the following specific example embodiments of the present disclosure will be discussed in more detail, especially the selecting of the representative services from the set of services. Reference is also made to FIG. 8.

The obtained 51 information is stored in a service history database (DB) 81, and this information is then analysed 52 to determine which services may be regarded as representative of other services in terms of usage.

By designating a service to be a representative service for a set of given services, the occurrence/non-occurrence of a representative service should allow prediction of the usage of a represented service with relatively high certainty. Formally, the probability of occurrence of service B given the occurrence of service A can be given as follows:

$$P(B=1 \mid A=1) = \frac{P(A=1 \cup B=1)}{P(A=1)} \quad \text{(I)}$$

Similarly, the probability of non-occurrence of service B, given the occurrence of service A can be given as follows:

$$P(B=0 \mid A=1) = 1 - P(B=1 \mid A=1) \quad \text{(II)}$$

Now, the certainty with which it is possible to predict the usage of service B, given the occurrence of service A, represented by $\text{Certainty}_{(A=1, B)}$, can be computed using the following entropy based formula:

$$\begin{aligned} \text{Certainty}_{(A=1,B)} &= -\text{Entropy}(B \mid A=1) \\ &= \sum_{i=0,1} P(B=i \mid A=1) * \\ &\quad \log P(B=i \mid A=1) \end{aligned} \quad \text{(III)}$$

Similarly, the certainty with which we can predict the usage of service B, given the non-occurrence of service A, represented by $\text{Certainty}_{(A=0, B)}$, can be computed using the following entropy based formula:

$$\begin{aligned} \text{Certainty}_{(A=0,B)} &= -\text{Entropy}(B \mid A=0) \\ &= \sum_{i=0,1} P(B=i \mid A=0) * \\ &\quad \log P(B=i \mid A=0) \end{aligned} \quad \text{(IV)}$$

These two certainties can be combined in one overall certainty with which the usage (occurrence/non-occurrence) of service A can be used to predict the usage of service B. This can be done by taking the weighted sum of above mentioned two certainties. Let us define the weights of Certainty$_{(A=1, B)}$ and Certainty$_{(A=0, B)}$ as w$_{(A=1)}$ and w$_{(A=0)}$, respectively. w$_{(A=1)}$ and w$_{(A=0)}$ can be given as follows:

w$_{(A=1)}$=percentage of time-slots in future (till the representative services are recomputed) in which the service A will be used≅percentage of time slots from past (since last instance of representative service computation occurred) in which service A has been used.

w$_{(A=0)}$=percentage of time-slots in future (till the representative services are recomputed) in which the service A will not be used≅percentage of time slots from past (since last instance of representative service computation occurred) in which service A has not been used.

Thus, it is possible to compute the certainty with which the usage of service A can predict the usage of service B as:

$$\text{Certainty}_{(A,B)} = w_{(A=1)} * \text{Certainty}_{(A=1,B)} + w_{(A=0)} * \text{Certainty}_{(A=0,B)} \quad (V)$$

The intention is to choose a service A as a representative service of service B if it the usage of A predicts the usage of service B with high certainty. An embodiment of the method of selecting a representative services is given as an example as follows:

1) For each ordered pair of services (A, B) compute the Certainty$_{(A,B)}$. Suppose the certainty matrix 82 is as follows, where element m(i,j) represents Certainty$_{(i,j)}$.

TABLE 3

Certainty matrix 82 showing correlations between the usage of different services A-G in the same time slot.

|   | A | B | C | D | E | F | G |
|---|---|---|---|---|---|---|---|
| A | 1 | 0.7 | 0.15 | 0.9 | 0.2 | 0.6 | 0.3 |
| B | 0.3 | 1 | 0.85 | 0.7 | 0.4 | 0.8 | 0.2 |
| C | 0.4 | 0.8 | 1 | 0.95 | 0.5 | 0.7 | 0.8 |
| D | 0.9 | 0.7 | 0.7 | 1 | 0.9 | 0.4 | 0.6 |
| E | 0.8 | 0.6 | 0.6 | 0.4 | 1 | 0.5 | 0.2 |
| F | 0.5 | 0.3 | 0.6 | 0.5 | 0.7 | 1 | 0.95 |
| G | 0.4 | 0.45 | 0.7 | 0.6 | 0.6 | 0.85 | 1 |

2) For each service, its representative service is selected. Service A is chosen as representative service of service B if the usage of A predicts the usage of service B with sufficient certainty. Using the above certainty matrix 82 the following representative services are obtained:

TABLE 4

| Representative service | Represented service(s) |
|---|---|
| D | A, E |
| C | B, D |
| B | C |
| G | F |
| F | G |

3) The above relations are sorted based on the number of services a representative service represents.
4) The set of representative services RS=Ø are initialized. Also the set of covered services CS=Ø are initialized. Covered services are the services that are either representative services or whose representative service has been included into the set of representative services.

5) Starting from the top of the sorted relations the following is done:

a) For a given relation, If anyone of the represented services is not in the CS, then the representative service is added to the set CS. Also, the representative and represented services of this relation is added to the set CS. Otherwise, go to the next relation.

b) Step a) is repeated until all the relation are analysed.

c) If there is a service which is not represented in the set CS, then this service is added to the set RS.

The final set of RS in accordance with this specific example will thus be as in Table 5.

TABLE 5

| Representative service | Represented service(s) | RS (initialized to Ø) | CS (initialized to Ø) |
|---|---|---|---|
| D | A, E | RS = {D} | CS = {A, D, E} |
| C | B, D | RS = {C, D} | CS = {A, B, C, D, E} |
| B | C | RS = {C, D} | CS = {A, B, C, D, E} |
| G | F | RS = {C, D, G} | CS = {A, B, C, D, E, F, G} |
| F | G | RS = {C, D, G} | CS = {A, B, C, D, E, F, G} |

Thereby, the services are grouped 61 to reduce the number of services in the RS set. Then, this grouping may be used for the predicting 53 and 54 during real time service usage 83.

Below follows another aspect of the present disclosure.

According to an aspect of the present disclosure, there is provided a network node 6 for a communication network 1. The network node 6 comprises means (e.g. the processing circuitry 41 in cooperation with the communication interface 47) for obtaining 51 information about which services A, B and/or C, of a plurality of services, have historically been used in which time slots 11 in the communication network 1. The network node 6 also comprises means (e.g. the processing circuitry 41, such as the analysis unit 42) for analysing 52 the obtained 51 information to determine that, whether a first service A of the plurality of services is used in any of the historic time slots 11, correlates with whether a second service B of the plurality of services is used in said historic time slot. The network node 6 also comprises means (e.g. the processing circuitry 41, such as the ML prediction unit 42) for predicting 53 whether the first service A will be used by the user 2 in the future time slot 11. The network node 6 also comprises means (e.g. the processing circuitry 41, such as the correlation prediction unit 42) for predicting 54, based on whether the first service A has been predicted 53 to be used in the future time slot 11, whether the second service B will be used by the user 2 in said future time slot 11.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A method in a communication network, the method comprising:
obtaining information about which services, of a plurality of services, have historically been used in which historic time slots in the communication network;
analyzing the obtained information;
based on analyzing the obtained information, determining that using a first service in one or more of the historic time slots correlates with using a second service in said one or more of the historic time slots, wherein the first service belongs to a first group of services, the second service belongs to a second group of services, and the second service is a representative service of the second group of services;
predicting whether the first service will be used by a user in a future time slot;
predicting, based on that the first service has been predicted to be used in the future time slot, whether the second service will be used by the user in the future time slot;
determining that the second service belongs to the second group of services;
predicting, based on that (i) the second service is a representative service, (ii) the second service belongs to the second group of services, (iii) a third service also belongs to the second group of services, (iv) the third service is a represented service, and (v) the second service has been predicted to be used by the user in the future time slot, whether the third service will be used by the user in the future time slot; and
adjusting at least one parameter of the communication network based on the prediction of whether any of the first service, the second service, and the third service will be used by the user in the future time slot.

2. The method of claim 1, wherein the prediction of whether the first service will be used is based on a machine learning algorithm.

3. The method of claim 2, wherein the machine learning algorithm is based on a hidden Markov model (HMM) or a Bayesian network model.

4. The method of claim 1, wherein said at least one parameter comprises a discontinuous reception (DRX) parameter for the user.

5. The method of claim 1, wherein the step of predicting whether the second service will be used in the future time slot comprises predicting that the second service will be used in the future time slot if the step of predicting whether the first service will be used in the future time slot comprises predicting that the first service will be used in said future time slot.

6. The method of claim 1, wherein the obtained information indicates that a correlation between the second service and the third service is higher than a correlation between the first service and the third service.

7. The method of claim 1, wherein the method is performed by a node in a core network of the communication network.

8. The method of claim 1, wherein the step of analyzing comprises determining that whether the first service is used in said one or more of the historic time slots correlates with whether the second service is used in said one or more of the historic time slots at least 70%.

9. The method of claim 1, wherein each of the future and historic time slots has a uniform length of between 1 and 30 minutes.

10. The method of claim 1, wherein the plurality of services comprises Voice over IP, streaming video, e-mail, instant messaging, social networking, and/or automatic application updating services used by the user.

11. The method of claim 1, wherein the user is a mobile phone, a computer, or a machine-to-machine (M2M) device.

12. The method of claim 1, wherein the historic time slots have the same duration.

13. The method of claim 1, wherein
the method is performed by a network node, and
the network node i) is included in a core network or a radio access network of a base station or (ii) is a base station.

14. A network node for a communication network, the network node comprising:
processor circuitry; and
a storage unit storing instructions that, when executed by the processor circuitry, cause the network node to:
obtain information about which services, of a plurality of services, have historically been used in which historic time slots in the communication network;
analyze the obtained information;
based on analyzing the obtained information, determining that using a first service in one or more of the historic time slots correlates with using a second service in said one or more of the historic time slots, wherein the first service belongs to a first group of services, the second service belongs to a second group of services, and the second service is a representative service of the second group of services;
predict whether the first service will be used by a user in a future time slot;
predict, based on that the first service has been predicted to be used in the future time slot, whether the second service will be used by the user in the future time slot;
determine that the second service belongs to the second group of services;
predict, based on that (i) the second service is a representative service, (ii) the second service belongs to the second group of services, (iii) a third service also belongs to the second group of services, (iv) the third service is a represented service, and (v) the second service has been predicted to be used by the user in the future time slot, whether the third service will be used by the user in the future time slot; and
adjust at least one parameter of the communication network based on the prediction of whether any one or any combination of the first service, the second service, and the third service will be used by the user in the future time slot.

15. The network node according to claim 14, wherein the obtained information indicates that a correlation between the second service and the third service is higher than a correlation between the first service and the third service.

16. A computer program product comprising a non-transitory computer readable medium storing a computer program, the computer program comprising computer program code which is able to, when run on processor circuitry of a network node, cause the network node to:
obtain information about which services, of a plurality of services, have historically been used in which historic time slots in a communication network;
analyze the obtained information;
based on analyzing the obtained information, determining that using a first service in one or more of the historic time slots correlates with using a second service in said one or more of the historic time slots, wherein the first service belongs to a first group of services, the second service belongs to a second group of services, and the second service is a representative service of the second group of services;

predict whether the first service will be used by a user in a future time slot;

predict, based on that the first service has been predicted to be used in the future time slot, whether the second service will be used by the user in the future time slot;

determine that the second service belongs to the second group of services;

predict, based on that (i) the second service is a representative service, (ii) the second service belongs to the second group of services, (iii) a third service also belongs to the second group of services, (iv) the third service is a represented service, and (v) the second service has been predicted to be used by the user in the future time slot, whether the third service will be used by the user in the future time slot; and adjust at least one parameter of the communication network based on the prediction of whether any one or any combination of the first service, the second service, and the third service will be used by the user in the future time slot.

17. The computer program product according to claim 16, wherein the obtained information indicates that a correlation between the second service and the third service is higher than a correlation between the first service and the third service.

* * * * *